US005124526A

United States Patent [19]

Muller et al.

[11] Patent Number: 5,124,526

[45] Date of Patent: Jun. 23, 1992

[54] ION SOURCE

[75] Inventors: Jurgen Muller, Frankfurt; Roland Gesche, Seligenstadt; Manfred Zipf, Kahl, all of Fed. Rep. of Germany

[73] Assignee: Leybold Aktiengesellschaft, Fed. Rep. of Germany

[21] Appl. No.: 662,259

[22] Filed: Feb. 28, 1991

[30] Foreign Application Priority Data

Jun. 21, 1990 [DE] Fed. Rep. of Germany ....... 4019729

[51] Int. Cl.[5] ................................................ B23K 9/00

[52] U.S. Cl. .......................... 219/121.54; 219/121.57; 219/121.43; 315/111.51

[58] Field of Search ...................... 219/121.54, 121.57, 219/121.55, 121.4, 121.43; 315/111.21, 111.51, 111.81; 313/230.31; 204/192.1, 192.11

[56] References Cited

U.S. PATENT DOCUMENTS 3,814,983 6/1974 Weissfloch et al. ............ 315/111.51
4,381,453 4/1983 Cuomo et al. .................. 204/192.11
4,629,940 12/1986 Gagne et al. ................... 315/111.51
4,795,880 1/1989 Hayes et al. .................. 219/121.54
4,849,675 7/1989 Muller ........................... 315/111.51
4,894,510 1/1990 Nakanishi et al. ............... 204/192.1

FOREIGN PATENT DOCUMENTS 2004839 11/1974 Fed. Rep. of Germany .
3632340 3/1988 Fed. Rep. of Germany .

OTHER PUBLICATIONS

"Deposition of Tantalum and Tantalum Oxide by Superimposed RF and D-C Sputtering", by F. Vratny, pp. 505-508, Journal Electrochem. Society May 1967.

*Primary Examiner*—Mark H. Paschall
*Attorney, Agent, or Firm*—Eckert Seamans Cherin & Mellott

[57] ABSTRACT

An apparatus for the generation of an inductively excited ion or plasma source includes an amplification system and a high frequency excitation coil which are coupled to form a self-starting free-running excitation oscillator.

9 Claims, 2 Drawing Sheets

ION SOURCE

The invention relates to an ion source according to the Preamble of Patent Claim 1.

Ion and plasma sources are required for numerous applications for example in order to etch given materials or to coat them. As a rule the known ion and plasma sources have a gas chamber in which gaseous matter is split into electrically charged particles which subsequently due to their characteristic acceleration or with the aid of extraction grids are applied on the material to be etched or coated.

An inductively excited ion source is known having a container for the reception of plasma to be ionized wherein this container is surrounded by a waveguide which is connected with a high-frequency generator (U.S. Pat. No. 4,849,675). Herein the two ends of the waveguide are at the same potential and the length of the waveguide is $$n * \frac{c}{2f}$$

where n is a number other than zero, c the phase velocity of the electromagnetic wave, and f the frequency of the high-frequency generator. The frequency of the high-frequency generator is turned by means of special tuning means to the characteristic frequency of the system comprising the waveguide, the plasma to be ionized, or to a harmonic frequency to this characteristic frequency.

The high-frequency generator requires a relatively high expense. Moreover, the high-frequency generator and the excitation coil of the ion source are spatially separated from each other and connected only via a coupling cable. In order to match the operating frequency of the ion source to the operating frequency of the transmitter a special coupling network is required.

The invention is based on the task of creating an inductively excited ion or plasma source in which a coupling network connected to the excitation coil is superfluous.

This task is solved according to the Features of Patent Claim 1.

The advantage achieved with the invention consists in that a build-up to the optimum operating frequency is automatically accomplished. Moreover, the entire ion source can be realized as a very small structural element.

BRIEF DESCRIPTION OF DRAWINGS

An embodiment example of the invention is represented in the drawing and in the following will be described in greater detail. Therein show.

DETAILED DESCRIPTION OF DRAWINGS

Figure 1:
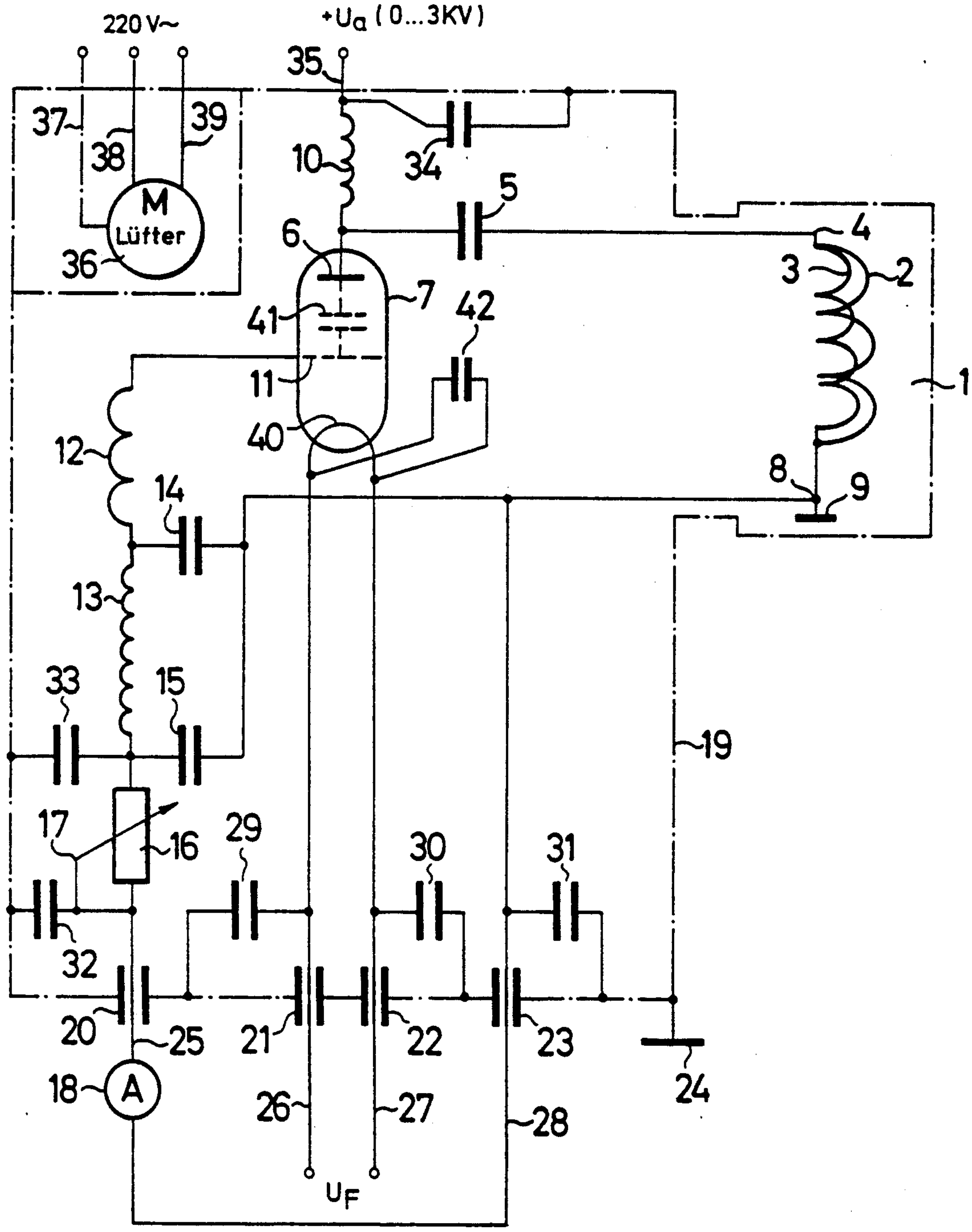
FIG. 1 a fundamental circuit diagram of a configuration according to the invention.

In FIG. 1 is shown a circuit configuration showing a high-frequency excitation coil 1 comprised of two layers 2, 3 looped around a quartz plasma container (not shown). The high-frequency excitation coil 1 is connected with its one terminal 4 via a coupling capacitor 5 with the anode 6 of a triode tube 7. The other terminal 8 of the excitation coil 1 is at ground 9. At the anode 6 is present via an inductance 10 the positive polarity of a dc voltage of for example 3 KV. The control grid 11 of the triode tube 7 is connected via an inductance 12 with a pi section acting as lowpass basic filter section and comprises a series inductance 13 and two transverse capacitors 14, 15. To this pi section is connected a potentiometer 16 whose variable terminal 17 together with a normal terminal of the potentiometer 16 is connected with an amperemeter 18.

It is the task of the pi section 13, 14, 15 to prevent the influence of the potentiometer 16 and the amperemeter 18 by interference voltages without impairing the bias voltage setting of the grid 11, which takes place with dc voltage. In addition, the pi section 13 to 15 is to prevent that high frequencies leak outside.

The circuit configuration described so far is encompassed by a metallic housing 19 having several feedthrough capacitors 20 to 23 in the housing wall. These feedthrough capacitors 20 to 23 are layed out for example for a nominal dc voltages of 440 V, ac voltages of 250 V, and a nominal current of 16 A. Via the feedthrough capacitors 21, 22 the supply with heating voltage $U_F$ takes place which is of a potential of for example 6.3 V while via the fed-through capacitor 20 flows the control grid current $I_G$. Between the metallic housing 19 which is connected to ground 24 and the low-frequency lines carried through the housing wall 19 are located block capacitors 29 to 32, which have for example a capacitance of 4700 pF and a dielectric strength of 3 KV. Further block capacitors 33, 34 are disposed between one terminal of the pi section 13, 14, 15 and the housing wall 19 as well as between the anode high-voltage feed 35 and the housing wall 19. Between the two cathode resistance wires 26, 27 in the immediate vicinity of the tube 7 is provided a block capacitor 42.

In the upper left corner of the housing 19 is represented a ventilator motor 36 from which electrical connecting lines 37, 38, 39 are carried through the housing to the outside. The presetting of the grid 11 of the tube 7 takes place with the aid of the potentiometer 16 and via the internal resistance of the tube 7. The current path within tube 7 takes place primarily via the electron flow between cathode 40 and anode 6 when the cathode heating voltage $U_F$ and the anode dc voltage $U_a$ are applied. The tube grid 11, with which the current flow can be controlled, is at negative potential with respect to the anode 6. The lower this potential the fewer electrons reach the anode 6 from the cathode 40.

The path anode 6/grid 11/potentiometer 16 represents a voltage divider for the grid bias voltage setting. The voltage applied at this voltage divider is the anode dc voltage $U_a$.

The inductances 12, 13 represent for dc current a shortcircuit so that via the amperemeter 18 the grid current can be measured.

The ac voltage signal of the high-frequency excitation coil 11 arrives via an internal tube capacitance 41 on grid 11 whereby the configuration comprising tube 7 and high-frequency excitation coil 1 is influenced. Since this configuration begins to oscillate through voltage noise which is always present these oscillations are determined by the characteristic frequency of the total configuration.

This characteristic frequency can change continuously and is determined by the inductance of coil 1, the electrical properties of the plasma chamber, and the tube capacitance 41. Coil 1 and tube 7 consequently together form the core of an oscillator oscillating freely whose resonance frequency—since coil 1 and tube 7 in terms of structure remain practically unchanged—is changed through the properties of the plasma chamber.

Figure 2:
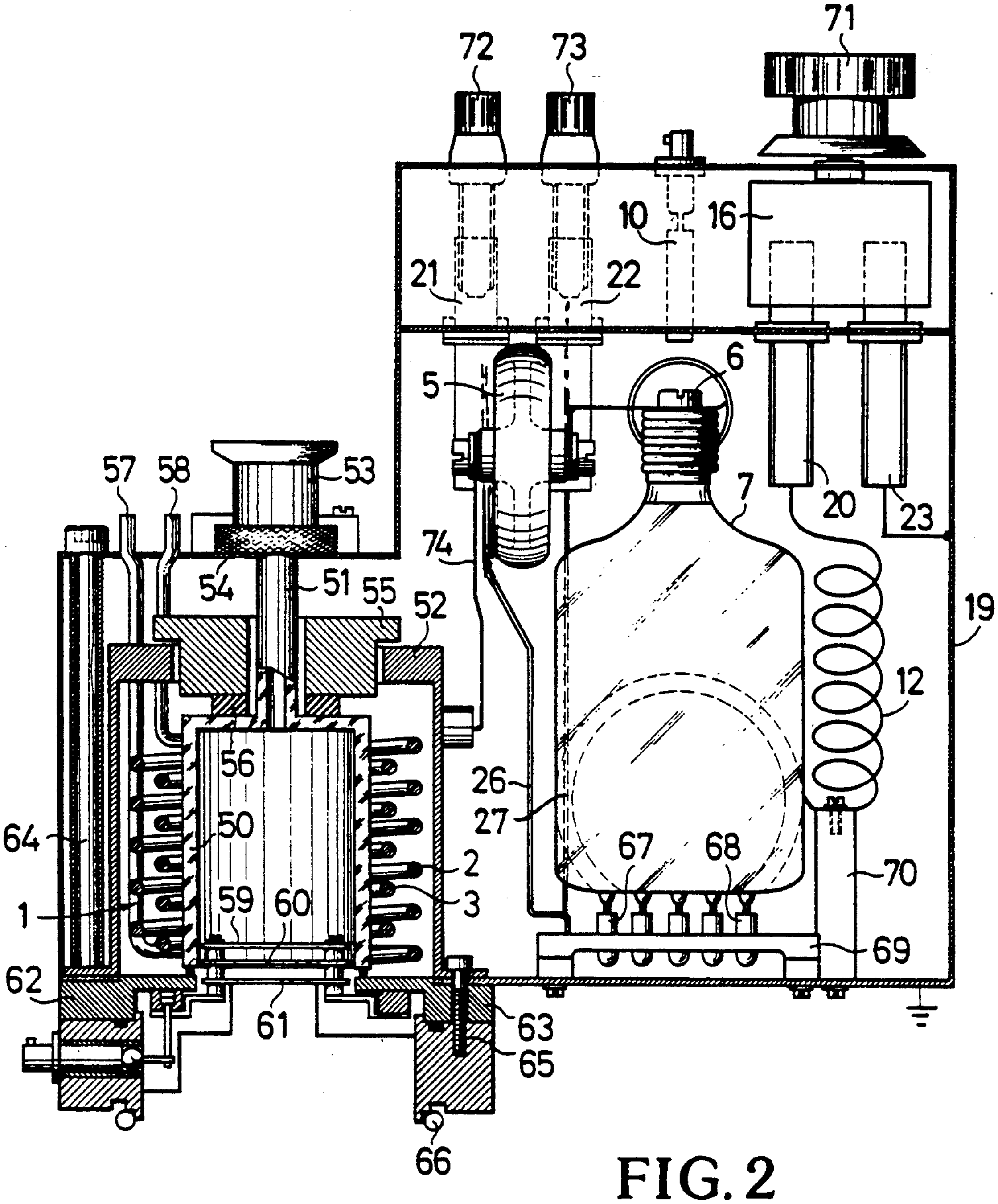
FIG. 2 a schematic representation of one spatial constructive embodiment of the invention.

In FIG. 2 is shown the mechanical constructional design of the configuration shown in FIG. 1. Those structural parts which functionally correspond to each other are in FIG. 2 given the same reference numbers as in FIG. 1. It can be seen in FIG. 2 that the tube 7 and the excitation coil 1 are together enclosed by the metallic housing 19. The excitation coil 1 is disposed around a glass vessel 50 having a gas feed port 51 which is connected with a gas feed 53 disposed outside of the housing 19. This gas feed 53 is screwed with a thumb screw 54 onto the housing 19. A pressure ring 55 is placed on a metallic enclosure 52 of the glass vessel 50 and is enjoined via an elastic O ring 56 with this glass vessel 50. The windings of coil 1 are water-cooled and therefore connected with cooling water feeds 57, 58.

At the bottom of the glass vessel are disposed three extraction grids 59, 60, 61 with which the stream of charged or uncharged particles can be controlled. With 62, 63 is identified the mounting of the ion chamber which is connected via screws 64, 65 with the housing 19 and is in connection with a (not shown) operating chamber. In this operating chamber are located materials bombarded by charged particles.

The interface to the operating chamber is characterized by a sealing 66. Tube 7 is disposed with its terminals 67, 68 on a mounting 69 which, in turn, is connected with the housing 19. For the coil 12 is provided a support insulator 70 of its own which likewise is connected with the housing 19.

The grid resistance 16 can be adjusted by a rotary wheel 71. With 72, 73 are identified jacks for the connection of the heating voltage $U_F$. To these jacks 72, 73 lead in each instance a feed of which the one is provided with the reference number 26 and the other with the reference number 27. Important for the present invention is the fact that the connecting line 74 between the anode 6 of tube 7 and the excitation coil 1 is very short.

The ventilator motor 36 cannot be seen in FIG. 2. It is, nevertheless, important since the tube 7 used is a radiation-cooled triode in which the blower must be switched on before initiating operation. This tube 7 is preferably operated in C-operation which is achieved through a correspondingly large negative bias voltage. A C-amplifier is a selective amplifier with a high degree of efficiency.

The plasma region is realised to a large extend through the glass vessel 50 which is for example 63 mm high at a wall thickness of 3 mm and has a diameter of 46 mm. In the gas inlet port 51 a dense wire plaiting can be provided which prevents a deceleration of the plasma in the gas feed.

Instead of a tube in principle a different control element can also be used, for example a transistor or a thyristor.

We claim:

1. An ion Source with a glass vessel (50) and an HF excitation coil (1) surrounding this vessel (50) as well as with an amplification element (7) having a control electrode, and an anode, characterized by the combination of the following features:

a) the HF excitation coil (1) is connected with an anode of the amplification element (7) across which flows a controlled current;

b) the control electrode (11) of the amplification element (7) is connected (for example via 41) being ac coupled with the HF excitation coil (1) wherein said HF excitation coil and said amplification element form a free running oscillator;

c) further wherein said glass vessel (50) with the HF excitation coil (1) and said amplification element (7) are located together in a metallic housing (19).

2. An ion source as stated in claim 1, characterized in that said distance is approximately equal or smaller than the lateral dimensions of the HF excitation coil (1).

3. An ion source as stated in claim 1, characterized in that the amplification element is a high frequency tube (7) having a control electrode.

4. An ion source as stated in claim 1, characterized in that the amplification element is a transistor.

5. An ion source as stated in claim 3, characterized in that the tube (7) is a triode.

6. An ion source as stated in claim 1, characterized in that the oscillation is frequency of the configuration determined by HF coil (1) and plasma region (50, 1) is essentially jointly determined through the electrical properties of the plasma.

7. An ion source as stated in claim 3, characterized in that the high-frequency tube (7) is driven as C-amplifier so that only the peaks of an ac voltage applied to said control electrode are amplified.

8. An ion source as stated in claim 1, characterized in that through the HF excitation coil (1) flows a cooling means.

9. An ion source as stated in claim 1, characterized in that electrical lines (26, 27, 35) are introduced into the housing (19) via feedthrough capacitors (29 to 32).

* * * * *